United States Patent
Huckfeldt et al.

(10) Patent No.: US 10,010,053 B2
(45) Date of Patent: Jul. 3, 2018

(54) MULTIDIRECTIONAL PLAY AND EXERCISE APPARATUS FOR ANIMALS

(71) Applicant: Palm Medical Solutions, LLC, Nixa, MO (US)

(72) Inventors: Roger Eugene Huckfeldt, Nixa, MO (US); Adam Kenneth Huckfeldt, Columbia, MO (US)

(73) Assignee: Palm Medical Solutions, LLC, Nixa, MO (US)

( * ) Notice: Subject to any disclaimer, the term of this patent is extended or adjusted under 35 U.S.C. 154(b) by 179 days.

(21) Appl. No.: 14/806,392

(22) Filed: Jul. 22, 2015

(65) Prior Publication Data

US 2016/0021851 A1 Jan. 28, 2016

Related U.S. Application Data (60) Provisional application No. 62/028,069, filed on Jul. 23, 2014.

(51) Int. Cl.
*A01K 1/04* (2006.01)
*A01K 15/02* (2006.01)

(52) U.S. Cl.
CPC .......... *A01K 15/025* (2013.01); *A01K 15/027* (2013.01)

(58) Field of Classification Search
CPC .. A01K 15/025; A01K 15/026; A01K 15/027; A01K 15/02; A01K 27/003; A01K 1/04
USPC ....... 119/702, 707, 708, 786, 787, 788, 781, 119/780
See application file for complete search history.

(56) References Cited

U.S. PATENT DOCUMENTS

| | | | | |
|---|---|---|---|---|
| 1,699,308 A | * | 1/1929 | Postings | A01K 15/027 119/704 |
| 2,096,078 A | | 10/1937 | Windson | |
| 2,295,581 A | | 9/1942 | Hyde | |
| 2,307,905 A | * | 1/1943 | Ament | A01K 15/025 119/708 |
| 2,481,559 A | * | 9/1949 | Ashbaugh | A01K 1/04 119/797 |
| 3,295,499 A | * | 1/1967 | Manchester | A01K 15/025 119/708 |

(Continued)

OTHER PUBLICATIONS

International Search Report and Written Opinion dated Apr. 28, 2016 for International Patent Application No. PCT/US 15/41790, 12 pages.

(Continued)

*Primary Examiner* — Trinh T Nguyen
(74) *Attorney, Agent, or Firm* — Shook, Hardy & Bacon L.L.P.

(57) ABSTRACT

A multidirectional play and exercise apparatus for animals is provided having a flexible pole, a sleeve encasing the pole, an attachment member coupled with or formed as part of the sleeve, and a base. The sleeve may be secured around the pole and be contiguous with the attachment member. The attachment member may be configured to receive a toy, or other item that encourages an animal to engage in play and/or exercise. The base allows the apparatus to freely rotate therein, thereby facilitating multidirectional play. The pole is flexible and bends when pulled on by the animal, thereby pulling back on the animal.

15 Claims, 7 Drawing Sheets

(56) References Cited

U.S. PATENT DOCUMENTS

| | | | | |
|---|---|---|---|---|
| 4,940,018 | A * | 7/1990 | Edling | A01K 15/025 |
| | | | | 119/708 |
| 5,148,769 | A * | 9/1992 | Zelinger | A01K 15/025 |
| | | | | 119/708 |
| 5,526,774 | A | 6/1996 | Swindall et al. | |
| 5,575,241 | A * | 11/1996 | Line | A01K 15/025 |
| | | | | 119/708 |
| 5,924,387 | A * | 7/1999 | Schramer | A01K 15/025 |
| | | | | 119/708 |
| 6,318,300 | B1 * | 11/2001 | Renforth | A01K 15/025 |
| | | | | 119/702 |
| 6,571,744 | B1 | 6/2003 | Olson et al. | |
| 6,892,675 | B1 * | 5/2005 | Comerford | A01K 15/025 |
| | | | | 119/706 |
| 8,978,591 | B2 * | 3/2015 | Cogswell | A01K 15/025 |
| | | | | 119/708 |
| 2011/0277697 | A1 * | 11/2011 | Lipscomb | A01K 15/025 |
| | | | | 119/708 |

OTHER PUBLICATIONS

Tether Tug—Interactive Dog Toy for Big Dogs & Small Dogs [online]. Feb. 1, 2015 [retrieved Apr. 14, 2016]. Retrieved from the Internet: URL: http://web.archive.org/web/20150201084022/http://www.tethertug.com/, entire document, especially text, photos, and non-printable Flash content.

International Preliminary Report on Patentability dated Feb. 1, 2018 in International Patent Application No. PCT/US2015/041790, 8 pages.

* cited by examiner

MULTIDIRECTIONAL PLAY AND EXERCISE APPARATUS FOR ANIMALS

CROSS-REFERENCE TO RELATED APPLICATIONS

This application claims priority to U.S. Provisional Patent Application No. 62/028,069, entitled "An Apparatus to Provide Multidirectional Play and Exercise for Animals," filed Jul. 23, 2014, the entirety of which is hereby incorporated by reference.

STATEMENT REGARDING FEDERALLY SPONSORED RESEARCH OR DEVELOPMENT

Not applicable.

TECHNICAL FIELD

Embodiments of the present invention relate to an apparatus for facilitating exercise and play in animals.

BACKGROUND OF THE INVENTION

Animals require play and exercise to remain healthy. Commonly, this requires that a human walk or otherwise provide exercise to the animal. In addition to being time-consuming, this is often impractical. Further, current means of providing exercise to animals often require a substantial amount of space, such as a large yard or park. Additionally, many current play and exercise apparatuses are not portable and are often limited to a specific environment.

BRIEF SUMMARY OF THE INVENTION

The invention is defined by the claims below. This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of the present invention generally relate to a multidirectional play and exercise apparatus for animals (generally referred to hereinafter as the "apparatus"). In some embodiments, the apparatus includes a flexible pole, a sleeve, an attachment member and a base. The pole may be made from a flexible material and is configured to bend when the apparatus is in use. The sleeve may be coupled about an exterior surface of the flexible pole and extend beyond an upper end of the pole. The sleeve may be contiguous to, or integrally formed with the attachment member. The attachment member may be configured to receive a toy, or other item that encourages an animal to engage in play and/or exercise. The base may have an internal diameter that allows the pole to fit within the base and freely swivel, thereby allowing the apparatus to be pulled in any direction. The base may be anchored in order to support and reinforce the apparatus against tension exerted by the animal.

Because of the flexible nature of the pole, the apparatus provides resistance against the pull of the animal and as a result engages the animal in play and exercise. Additionally, the sleeve extends beyond the pole to provide a lax material that encourages tugging or pulling. Further, the base is configured to allow the apparatus to rotate. As such, the apparatus encourages interaction with the toy and provides a fun and engaging outlet for the animal.

Additional objects, advantages, and novel features of the invention will be set forth in part in the description that follows, and in part will become apparent to those skilled in the art upon examination of the following, or may be learned by practice of the invention.

BRIEF DESCRIPTION OF SEVERAL VIEWS OF THE DRAWINGS

The present invention is described in detail below with reference to the attached drawing figures, wherein.

DETAILED DESCRIPTION OF THE INVENTION

Figure 1:
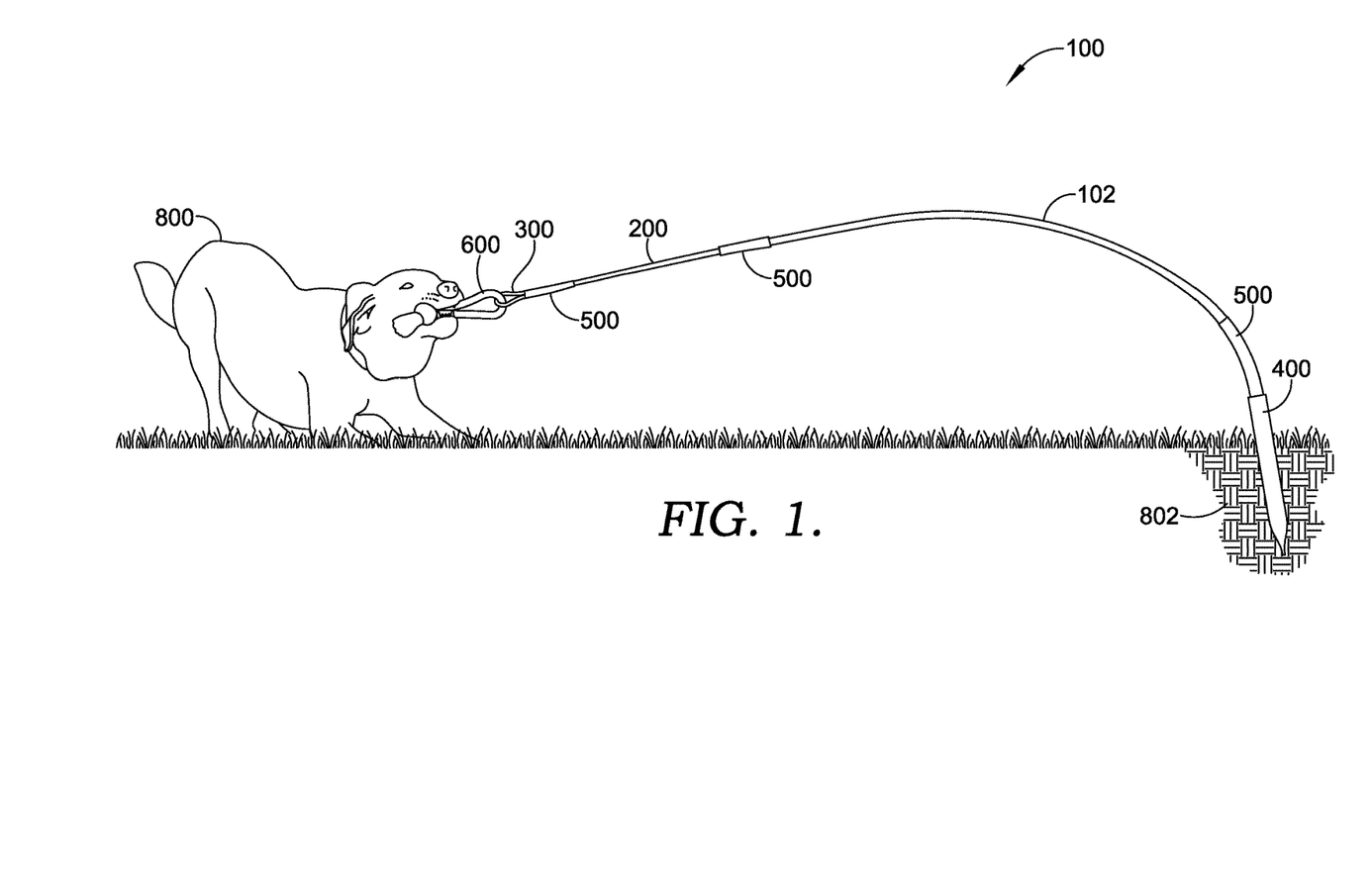
FIG. 1 is a side elevation view of a multidirectional play and exercise apparatus for animals, while in use, in accordance with an embodiment of the present invention.

As briefly described hereinabove, the present invention generally relates to a multidirectional play and exercise apparatus for animals ("apparatus"). Accordingly, FIG. 1 shows an exemplary embodiment of the apparatus 100, while in use by an animal 800. The apparatus 100 includes a pole 102, a sleeve 200 and an attachment member 300. The pole 102 may be made from a flexible material and is configured to bend when the apparatus 100 is in use. The pole 102 may be made from, for example, fiberglass, various composites, carbon fiber, and/or a deformable plastic. As will be appreciated, any other suitable material may also be used to form the pole 102. The sleeve 200 may be coupled about an exterior surface (shown as 103 in FIGS. 3-5) of the flexible pole and may encompass the entirety of the pole 102, such that the sleeve 200 extends beyond an upper end (shown as 106 in FIG. 2) of the pole 102. The sleeve 200 may be a hollow, rope-like polyethylene material, or other flexible and strong material. The apparatus 100 may additionally have an attachment member 300 contiguous to, or integrally formed with, the sleeve 200. For example, a distal end of the sleeve (shown as 206 in FIGS. 3-5) may be folded onto itself, such that a loop is formed, thereby creating the attachment member 300. The attachment member 300 is configured to receive a toy 600, or other item that encourages the animal 800 to engage in play and/or exercise.

In some embodiments, the apparatus 100 may include a base 400 that is configured to support the pole 102 and reinforce the pole 102 against tension exerted on the toy 600. The base 400 may have an internal diameter that allows the pole 102 to fit within the diameter and freely swivel, thereby allowing the apparatus 100 to be pulled in any direction. In some embodiments, the base 400 has a bottom end (shown as 402 in FIG. 4) that is pointed or tapered for insertion into the ground 802 or other substrate.

In additional aspects, the apparatus 100 may include one or more reinforcing elements 500 for reinforcing various portions of the apparatus 100. Reinforcing elements 500 may generally be incorporated at portions of the apparatus susceptible to stress and wear to enhance the durability of the apparatus. In one example, the reinforcing element 500 may be a durable and/or resilient thermoplastic material that is thermally bonded to one or more portions of the sleeve 200, pole 102, and/or the attachment member 300. For example, a reinforcing element 500 may be incorporated about the attachment member 300. Additionally, a reinforcing element 500 may be located about the sleeve 200 at the upper end of the flexible pole (shown as 106 in FIG. 2) for reinforcing the sleeve 200 against friction caused by use of the apparatus. In some aspects, a bottom end of the pole (shown as 104 in FIG. 2) may have a reinforcing element 500 for protecting the pole 102 and the sleeve 200 from friction caused by rotation within the base 400.

Relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects. Terminology relating to relative positions of various features of the apparatus is also used herein. For example, the terms "lower" and "bottom" refer to a portion of the apparatus that is nearer the base of the apparatus than the attachment member when the apparatus is in an assembled configuration/orientation. Accordingly, the terms "upper" and "top" refer to a portion of a feature that is nearer the attachment member than the base when the apparatus is in an assembled configuration/orientation. Additionally, as used herein, the term "proximal" refers to a portion of a feature herein that is nearer the bottom of the apparatus than the top of the apparatus. Resultantly, the term "distal" refers to a portion of a feature herein that is nearer the top of the apparatus than the bottom of the apparatus. Further, directional terminology is used herein. For example, the term "vertically" as used herein refers to a direction normal to parallel, or more normal to parallel than perpendicular, with parallel being the surface of the earth.

Figures 2, 3:
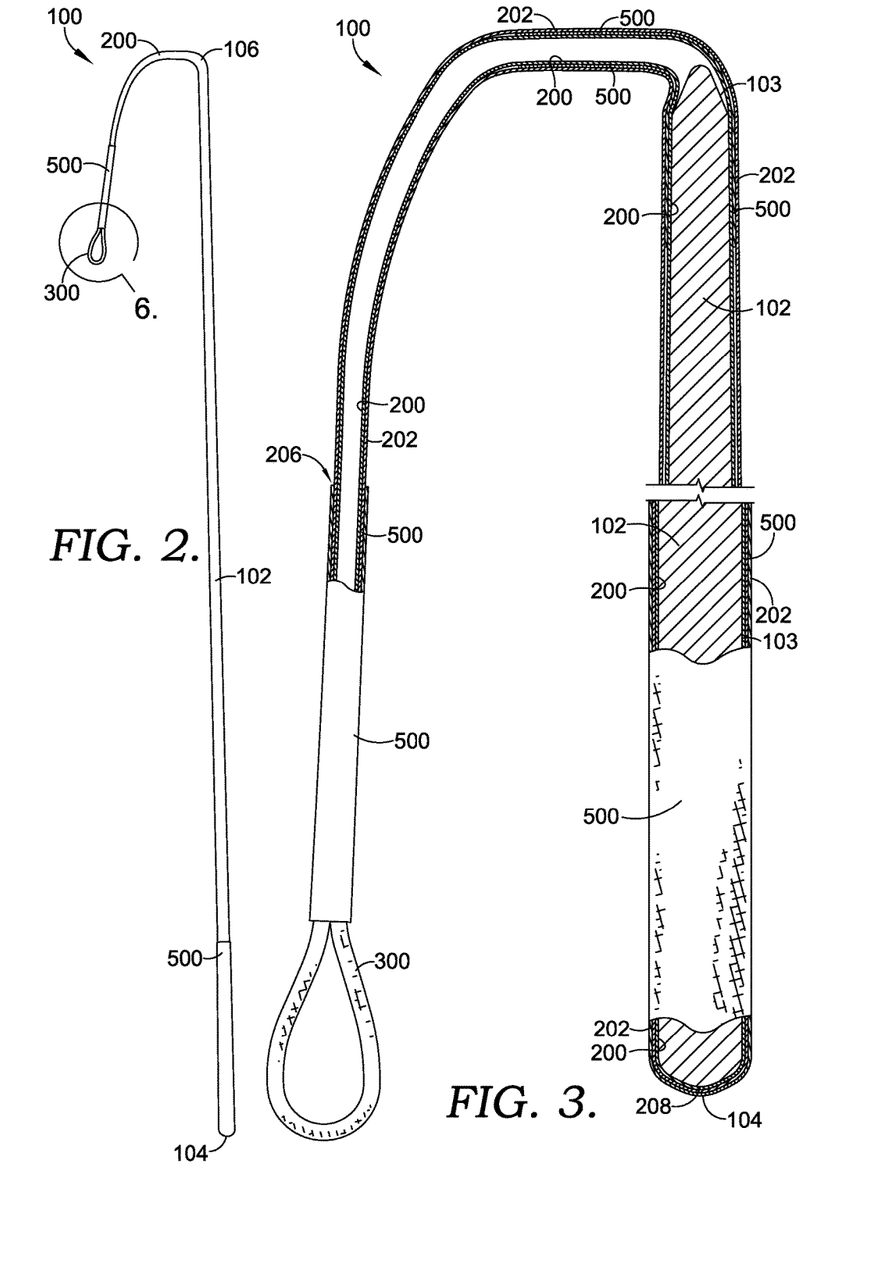
FIG. 2 is a side elevation view of the apparatus according to FIG. 1, while not in use.
FIG. 3 is an enlarged, partially cutaway, side elevation view of the apparatus according to FIG. 2, with a break line.

FIG. 2 illustrates an embodiment of apparatus 100 that is not in use. The pole 102 has a bottom end 104 and a top end 106. Beginning with the bottom end of the pole 104, the apparatus may include a reinforcing element 500 about the bottom end of the pole 104 and extending toward the top end of the pole 106. Additionally, the sleeve 200 may extend from the bottom end of the pole 104 beyond the top end of the pole 106, such that the sleeve 200 is lax or pendulous beyond the top end of the pole 106. As will be appreciated, the reinforcing element 500 about the bottom end of the pole 104 may also encompass the sleeve 200. As mentioned above, the sleeve 200 may be folded onto itself to form attachment member 300. The attachment member 300 may also be reinforced using a reinforcing element 500.

FIG. 3 illustrates an embodiment of the apparatus 100 that includes a flexible pole 102; a sleeve 200 coupled about an exterior surface 103 of the flexible pole 102; and an attachment member 300 contiguous to a distal end 206 of the sleeve 200. The apparatus 100 may also include a supplemental sleeve 202. In some aspects, the supplemental sleeve 202 may be a braided nylon, or other material that is more resistant to stretching than the sleeve 200 and that additionally adds reinforcing properties to the apparatus 100. Further, in aspects herein, the pole 102 may have a sleeve 200 and a supplemental sleeve 202 coupled about an exterior surface 103 of the pole 102 and encompassing the entirety of the pole 102. For example, the sleeve 200 and the supplemental sleeve 202 may extend around the entirety of the bottom end 104 of the pole 102 and be secured proximate to the bottom end 104 of the pole 102, such that the sleeve 200 and the supplemental sleeve 202 are held in place. In some aspects, the sleeve 200 and/or supplemental sleeve 202 may also be thermally bonded or otherwise affixed to the pole 102 at all or some portions of the pole 102 between the bottom end 104 of the pole 102 and the top end 106 (shown in FIG. 2) of the pole 102. Additionally, the supplemental sleeve 202 may cover the one or more reinforcing elements 500. For example, the reinforcing element 500 proximate the upper end 106 of the pole 102 is between the sleeve 200 and the supplemental sleeve 202, such that the supplemental sleeve 202 covers the reinforcing element 500. Further, in some embodiments, the supplemental sleeve 202 may extend the entirety of the sleeve 200 such that the supplemental sleeve 202 is also contiguous to or integrally formed with the attachment member 300.

Figures 4, 5:
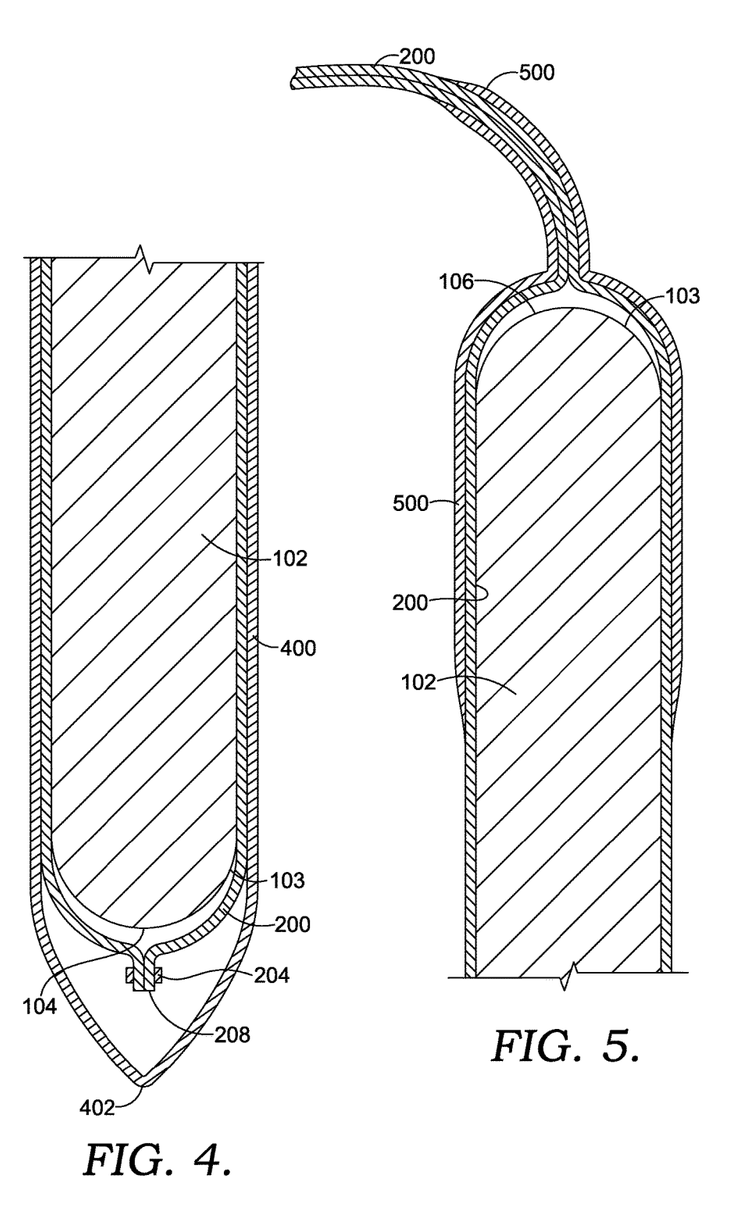
FIG. 4 is an enlarged, fragmentary, cross-sectional, side elevation view of a base of the apparatus according to FIG. 1.
FIG. 5 is an enlarged, fragmentary, cross-sectional, side elevation view of an upper end of a pole, and a sleeve of the apparatus according to FIG. 2.

FIG. 4 illustrates an embodiment of a base 400 with a pole 102 and a sleeve 200 inserted therein. The sleeve 200 may extend beyond a bottom end 104 of the pole 102 and be fastened at a proximate end 208 of the sleeve 200, for example, using a sleeve fastener 204. Although the sleeve fastener 204 is shown as a clip or crimp in FIG. 4, any means of fastening the sleeve 200 below the bottom end 104 of the pole 102, such that the sleeve 200 and the pole 102 are within the base 400, may be used. Additionally, in some embodiments, a bottom end 402 of the base 400 may be tapered or pointed such that the base 400 may be inserted into a substrate (e.g., the ground) for holding the apparatus 100 in place during use.

FIG. 5 illustrates an exemplary view of a top end 106 of the pole 102, a sleeve 200, and a reinforcing element 500. The top end 106 of the pole 102 may be convex, rounded, or tapered. The convex shape of the upper end 106 of the pole 102 reduces the friction between the upper end 106 of the pole 102 and the sleeve 200 when the apparatus 100 is in use. In turn, this also helps to prevent fraying and wear of the sleeve 200. Further, aspects herein may include the reinforcing element 500 for enhancing the durability of the apparatus 100 proximate to the upper end 106 of the pole 102.

In one example, the reinforcing element 500 may be a thermoplastic material that is thermally bonded to one or more portions of the sleeve 200, pole 102, and/or the attachment member 300. In some exemplary aspects, the reinforcing element 500 exhibits a high stress-crack resistance, while retaining high flexibility. In other aspects, the reinforcing element 500 may be made from thermoplastic polyurethane ("TPU"); ethylene vinyl acetate ("EVA"); polyolefins; synthetic or natural rubber (e.g., thermoset rubber having a sulfur or peroxide cured crosslink); silicone; cross-linked polyolefin foam (e.g., EVA, butane-based block copolymers, octane-based copolymers, and mixtures thereof); thermoset polyurethane foam (e.g., polyester, polyether, polycaproloactone); or thermoset polyurethane elastomers (e.g., polyester, polyether, polycaprolactone). Additionally, virtually any other material, such as a shrink-wrap, or fibers with the desired reinforcing properties may be used to form the reinforcing elements 500.

Figure 6:
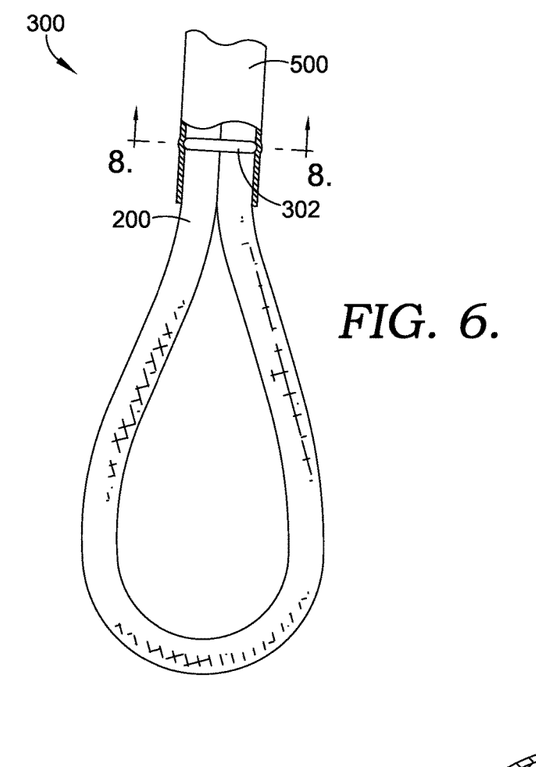
FIG. 6 is an enlarged, fragmentary, partially cutaway, side elevation view of an attachment member of the apparatus according to FIG. 2 taken in area 6.
Figure 7:
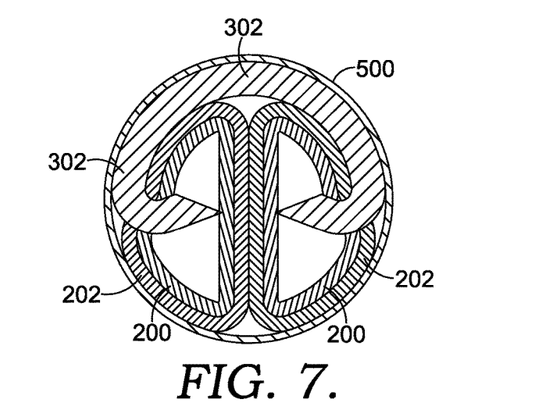
FIG. 7 is a cross-sectional view of the attachment member of the apparatus according to FIG. 6 taken along line 8-8.

FIG. 6 shows an embodiment of the attachment member 300. In this embodiment, the sleeve 200 has been folded onto itself and secured by a clip 302. FIG. 7 shows a cross-sectional view of the attachment member 300 secured by a clip 302. In embodiments, the clip 302 is placed at a portion of the attachment member 300 where the sleeve 200 has been folded onto itself. Accordingly, the embodiment in FIG. 7 includes the sleeve 200, the supplemental sleeve 202, and the reinforcing element 500. In this aspect, the clip 302 secures the sleeve 200 and the supplemental sleeve 202 to itself. Further, in this aspect, the reinforcing element 500 is included to cover the clip 302, the sleeve 200, and the supplemental sleeve 202. Although referred to as singular, multiple clips or other fasteners may be used in this embodiment. As can be appreciated, in this embodiment, the securing of the attachment member 300 can be accomplished using a variety of means including, but not limited to: clamps, clips, ties, and any other means of effectively fastening the attachment member 300.

The attachment member shown in FIGS. 6 and 7 is exemplary only and the attachment member may be formed using a variety of different shapes, means, and materials. As will be appreciated, any suitable means of affixing the distal end 206 of the sleeve 200 to the sleeve 200 is contemplated and considered within the scope of the invention. For example, in some aspects, the sleeve 200 may be adhesively bonded to itself using an adhesive or may be thermally bonded/welded to form the attachment member. In some embodiments, the entire sleeve may be made from a textile, or other material, that can be thermally bonded to itself to form the attachment member, such that no additional securing means are required other than heat to thermally bond the sleeve to itself. In other embodiments the sleeve 200 may be a braided material and the distal end 206 of the sleeve 200 may be woven back into the portion of the sleeve 200 where the distal end 206 of the sleeve 200 touches it.

Figure 8:
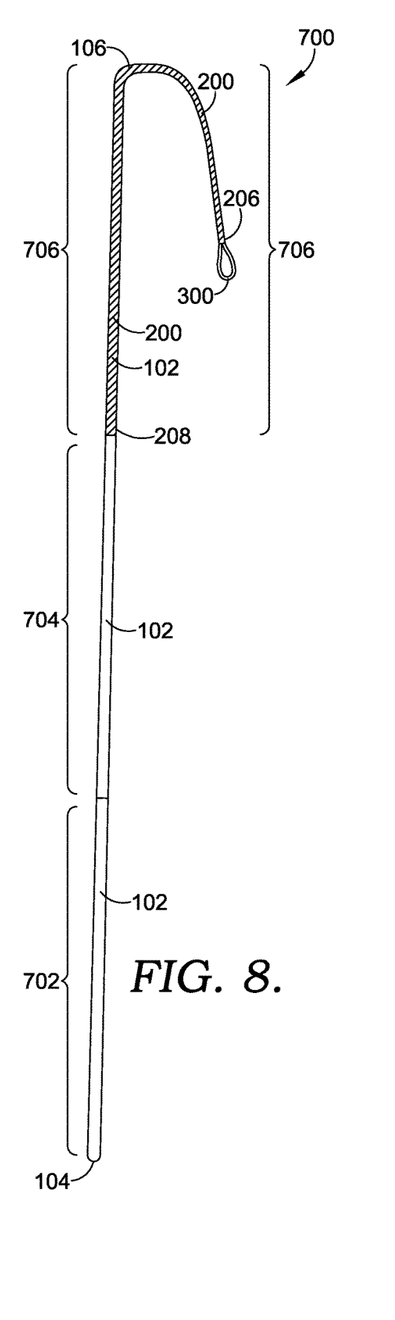
FIG. 8 is a side elevation view of a multidirectional play and exercise apparatus for animals having two or more portions, while not in use, in accordance with an alternate embodiment of the present invention.

In another embodiment, an apparatus 700 may come in multiple portions. This may be advantageous, for example, for shipping and packaging purposes. FIG. 8 illustrates one aspect of an apparatus 700 manufactured in multiple portions, having a first portion 706, a second portion 704, and a third portion 702. Although shown in FIG. 8 as comprising three different portions, the apparatus 700 may only comprise two portions or may comprise more than three portions. As will be appreciated, in some embodiments, the apparatus 700 may be formed without the third portion 702, such that the second portion 704 is the bottom-most portion of the pole 102. Accordingly, some embodiments herein may comprise a flexible pole 102 having at least a first portion 706 and at least a second portion 704 configured for attachment to the first portion 706; a sleeve 200 coupled about an exterior surface (shown as exterior surface 103 of the pole 102 in FIGS. 3-5) of the first portion 706 of the flexible pole 102 and extending beyond an upper end 106 of the flexible pole 102; an attachment member 300 contiguous to a distal end 206 of the sleeve 200; and a base (shown as base 400 in FIGS. 1 and 11-15) for receiving a bottom end (shown as 104 in FIGS. 2-4) of the flexible pole 102, such that the flexible pole 102 is freely rotatable within the base 400. This may be employed, for example, when the apparatus 700 is intended to be used by a smaller animal.

The sleeve 200 is coupled about an exterior surface 103 of at least the first portion 706 of the pole 102. The sleeve 200 may be adhesively or thermally bonded, or otherwise affixed, to all or part of the first portion 706 of the pole 102. In some aspects, portions of the pole 102 corresponding to the third portion 702, the second portion 704, and the first portion 706 of the apparatus 700 may have varying degrees of flexibility. For example, the third portion 702 may have a lower degree of flexibility as compared to the second portion 704 and the first portion 706. Accordingly, the first portion 706 may be more flexible than the second portion 704 and the third portion 702.

Figure 9:
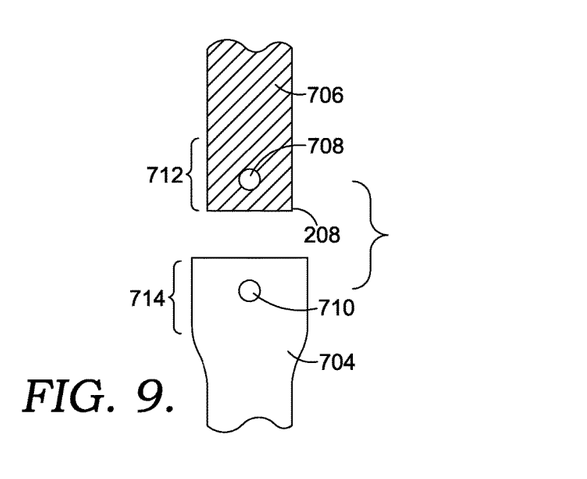
FIG. 9 is an enlarged, fragmentary, side elevation view of a joint between a first portion of a pole and a second portion of the pole of the apparatus according to FIG. 8.

The separate portions of the apparatus 700 may be joined, for example, as shown in FIG. 9. The first portion 706 may include a protrusion 708 for engaging an aperture 710 of the second portion 704. The protrusion 708 may be spring-loaded, or otherwise formed, such that it automatically engages aperture 710 to hold the separate portions in an engaged position. As will be appreciated, the means of affixing the separate portions of the apparatus 700 commonly include a means of disengaging the various portions. Further, as shown in FIG. 9, the separate portions of the apparatus 700 may have a male coupling member 712 and a female coupling member 714. As can be appreciated, many other means of engaging the different portions of the apparatus 700 may be used. By way of non-limiting examples, the two or more portions of the apparatus 700 may be engaged by a ferrule, a metal bus, and/or male and female threading.

In some aspects, the first portion 706, or other distal portion, of the apparatus 700 may include a pole and a sleeve that are integrally formed as one piece. For example, the first portion may be formed from a fibrous material, a portion of which is treated with a resin or other substance for forming the first, or most distal, portion of the pole. In some embodiments, a supplemental sleeve may be added to provide an additional layer of reinforcement to the sleeve at the first portion, as described hereinabove with reference to apparatus 100. In some aspects, the supplemental sleeve may be a braided nylon or polyethylene material.

As briefly described hereinabove, a toy 600 is generally configured to attract the animal and promote interaction with the apparatus 700. In aspects herein, the toy may be separate from the apparatus 700, such that the toy may be easily replaced or interchanged with other toys. The toy 600 may be configured for attachment to the attachment member 300 of the apparatus 700, using a karabiner or any other suitable means of attachment. Returning briefly to FIG. 1, in other aspects, webbing, or other suitable materials, may be used to form an oblong loop that connects with the attachment member 300. As such, the toy may be attached to the attachment member 300 using a soft material, such that an animal will not be harmed when they come in contact with the attachment portion of the toy 600.

Figure 10:
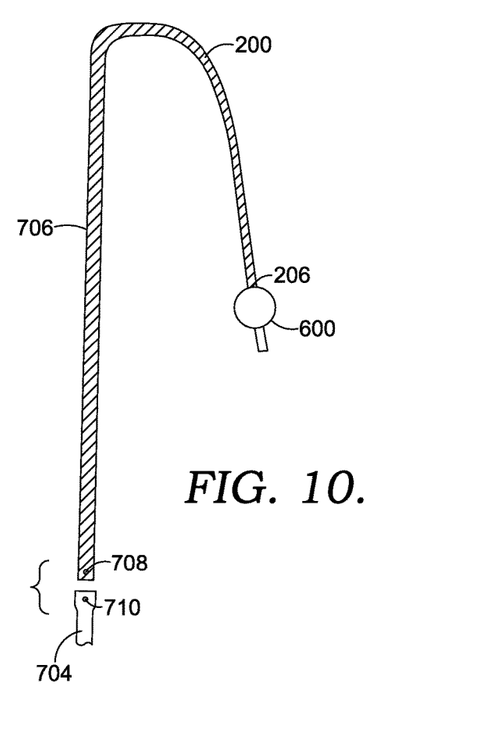
FIG. 10 is a fragmentary, side elevation view of an alternate embodiment of the first portion of the pole of the apparatus according to FIG. 8.

In some embodiments, the toy 600 may be integrally formed with a distal end 206 of the sleeve 200. FIG. 10 illustrates an exemplary aspect of the apparatus 700 according to FIG. 8 with a toy 600 integrally included therein. In this aspect, the first portion 706 of the apparatus 700 may comprise a toy 600 attached to a distal end 206 of the sleeve 200. Similar to other embodiments of the apparatus 700 according to FIG. 8, the first portion 706 may include a protrusion 708 for engaging an aperture 710 of the second portion 704. As such, the first portion 706 of the apparatus 700 may be replaceable and/or interchangeable. This allows for the toy 600 and the first portion 706 to be replaced when it has become worn or otherwise needs to be replaced.

In one alternative aspect, the sleeve 200 of the apparatus 700, according to FIG. 8, may extend all the way beyond the bottom end 104 of the pole 102, such that the sleeve 200 surrounds each portion of the apparatus 700, even before the apparatus 700 is assembled. In this aspect, the multiple portions may be folded upon one another for shipping and packaging. Accordingly, they may be assembled, for example, in a manner similar to tent poles. In this way, each of the portions remains attached to one another. In an alternative aspect, the pole may be telescopic. In this embodiment, the pole may have several portions, with each portion fitting within a portion having a larger diameter. Further, the sleeve may be affixed to the smallest or most distal portion of the pole.

Figures 11, 12:
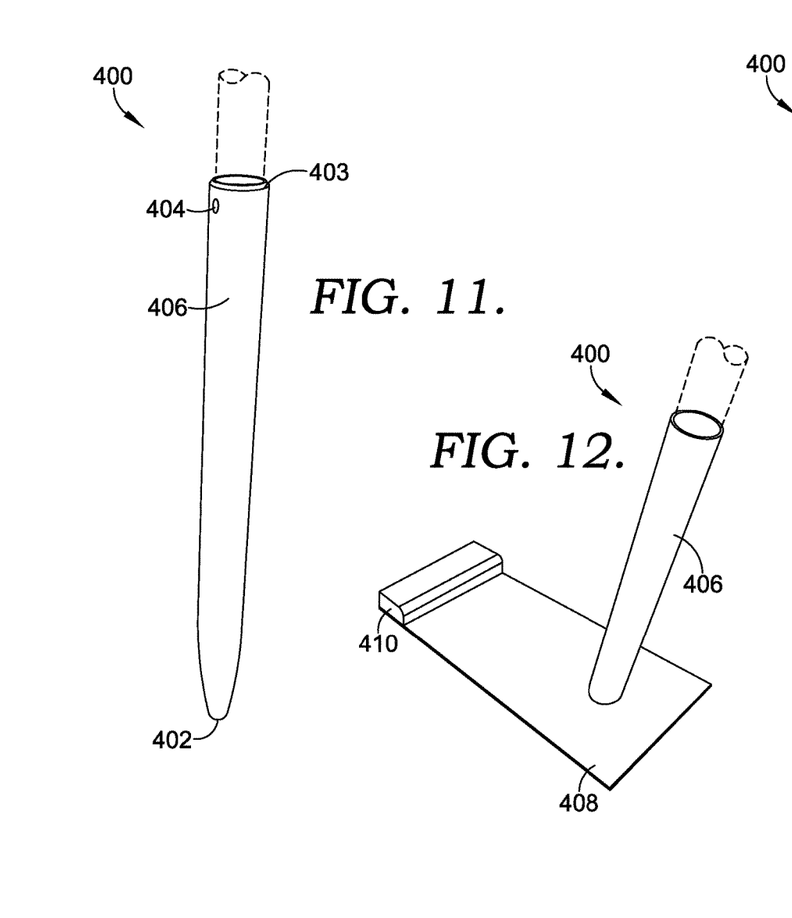
FIG. 11 is a perspective view of an exemplary tubular base of the apparatus, in accordance an embodiment of the present invention.
FIG. 12 is a perspective view of an exemplary base for indoor use of the apparatus, in accordance an embodiment of the present invention.

Turning now to FIGS. 11-15, each embodiment of the various bases described herein is suitable for use with each of the embodiments described hereinabove. In general, each base 400 is configured to support the pole 102 and reinforce the pole 102 against tension exerted on the distal end of the apparatus 100. The base 400 may be made of any suitable material. FIG. 11 shows one embodiment of the base 400 comprising a generally tubular structure having an internal diameter that allows the pole 102 to fit within the diameter and freely swivel. The base 400 according to FIG. 11 may be formed, for example, from a pipe made of steel or other suitable material. In some embodiments, the base 400 has a bottom end 402 that is pointed or tapered for insertion into the ground 802 or other substrate. In exemplary aspects, the base 400 may be inserted vertically or substantially perpendicular to the substrate using a mallet, hammer, or other suitable means. In some aspects, an upper end 403 of the base 400 may include a protective surface for preventing deformation of the base 400 during insertion. As such, when the apparatus 100 is in use, the direction of the force exerted on the apparatus 100 by the animal is different from the direction of the orientation of the base 400. Accordingly, the apparatus 100 is held in place by the base 400 when the force is exerted at the distal end of the apparatus. Further, in some aspects, the base 400 according to FIG. 11 may include removal apertures 404 for receiving a lever, such as a screwdriver or other generally round object. As such, when the base 400 is inserted into the substrate, the removal apertures 404 may remain exposed, such that the base 400 may be extracted from the substrate using the lever.

Figure 13:
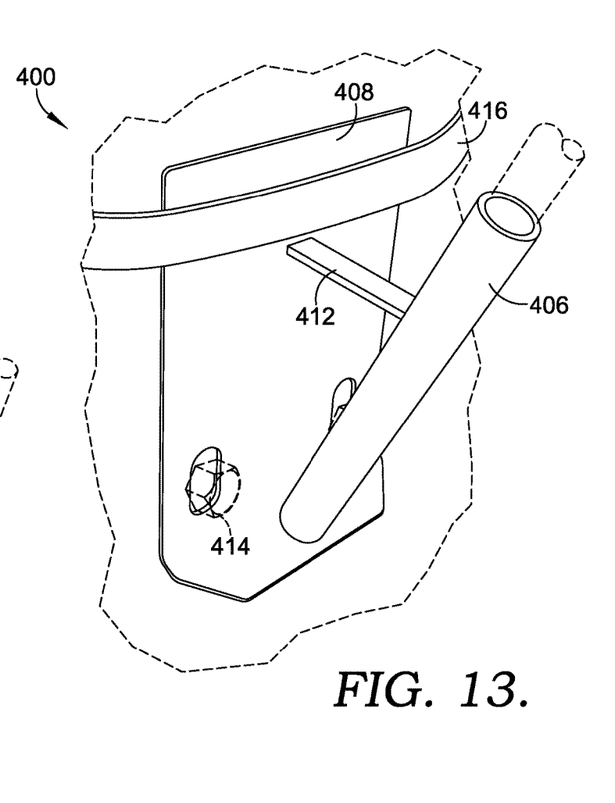
FIG. 13 is a perspective view of an exemplary base for mounting on a vertical surface for use of the apparatus, in accordance with an embodiment of the present invention.

FIG. 12 illustrates a base 400 having a tube 406, a base plate 408 and a stop 410. In some aspects, the tube 406 is welded, or otherwise permanently affixed, to the base plate 408. Additionally, the stop 410 may be welded, or otherwise permanently affixed, to the base plate 408. The base 400 according to FIG. 12 may be used, for example, indoors and be used to secure the apparatus to an object. In one exemplary aspect, the base 400 according to FIG. 12 may be secured under a door, such that the door intersects the base plate 408 and in a substantially perpendicular direction between the tube 406 and the stop 410. Further, the base 400 according to FIG. 12 may include only the tube 406 and the base plate 408, without the stop 410. As such, the base 400 may be slideably or otherwise placed beneath an object that holds the apparatus in place. FIG. 13 illustrates another aspect of base 400. In this aspect, the base 400 is configured for attachment to a vertically oriented surface. Similar to the base 400 according to FIG. 12, the base 400 according to FIG. 13 may include a base plate 408 and a tube 406. Additionally, the base 400 may include a reinforcing member 412. In this embodiment, the base 400 may be removeably attached to the vertically oriented surface using lag bolts 414, straps 416, or any other suitable means.

Figures 14, 15:
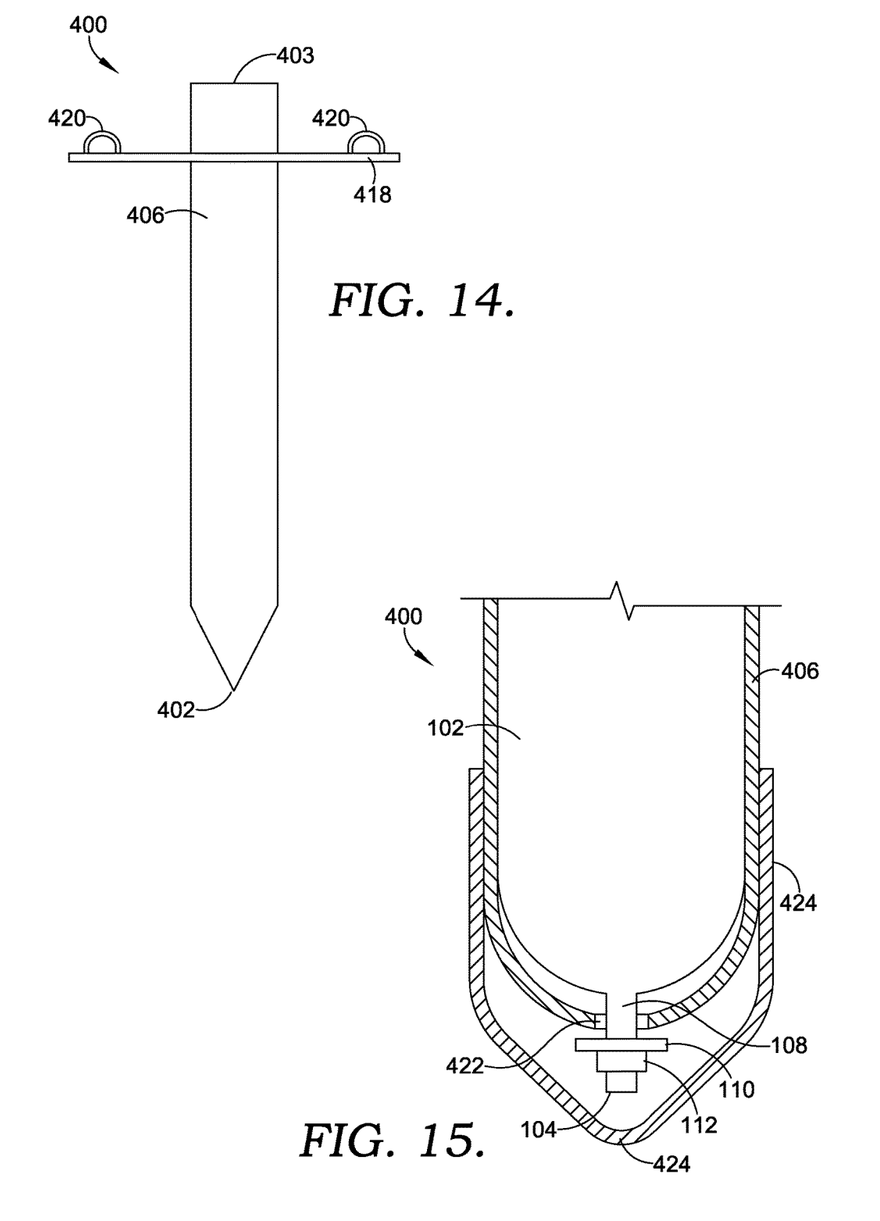
FIG. 14 is a side elevation view of an alternate embodiment of the base according to FIG. 11.
FIG. 15 is an enlarged, fragmentary, cross-sectional, side elevation view of an exemplary tubular base having a securing mechanism for the apparatus, in accordance with an embodiment of the present invention.

FIG. 14 illustrates an alternate embodiment of the base 400 of FIG. 11. In this embodiment, the base 400 includes a stabilizing plate 418. The stabilizing plate 418 may be affixed to the base 400 and in a perpendicular or substantially perpendicular orientation, such that the stabilizing plate 418 is parallel and proximate to the substrate when the base 400 is inserted therein. Further, the stabilizing plate 418 may be used to insert the base 400 in the substrate. For example, the stabilizing plate 418 may be stepped on or hammered to insert the base 400 into the substrate. Further, the base 400 may include removal loops 420 that may be used to pull or otherwise extract the base 400 from the substrate.

In another aspect, a base 400 may have a securing mechanism for securing the pole 102 within the base 400. FIG. 15 illustrates a base 400 having an opening 422 for receiving a keeper 108 affixed to or integrally formed at a bottom end 104 of the pole 102. The keeper 108 may be a fastener or other projection at the bottom end 104 of the pole 102. As such, the keeper 108 may be inserted within the opening in the base 400 and secured, such that the pole 102 is still freely rotatable within the base 400. By way of example only, the keeper 108 may be a threaded member that is affixed using a lock nut 112 and a washer 110. As can be appreciated, any number of securing mechanisms may be used to secure the pole 102 within the base 400, such as a keeper pin or clip. Further, the base 400 may have a cover 424 for covering the securing mechanism prior to placing the base 400 in the substrate. Any suitable means may be used for fixing the cover 424 to the base 400. As can also be appreciated, any of the other embodiments of the bases described herein may include a means of rotatably securing the pole 102 therein.

From the foregoing, it will be seen that this invention is one well adapted to attain all the ends and objects hereinabove set forth together with other advantages, which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The claimed invention is:

1. An apparatus for encouraging exercise in animals, comprising:
   a flexible pole having an exterior surface, an upper end, and a bottom end opposite the upper end;

a sleeve coupled about the exterior surface of the flexible pole and having a distal end, wherein the sleeve surrounds a length of the flexible pole between the upper end and the bottom end and extends beyond the upper end of the flexible pole and extends beyond the bottom end of the flexible pole; and an attachment member adjacent to the distal end of the sleeve.

2. The apparatus of claim 1, wherein the flexible pole is convex at an upper end of the flexible pole.

3. The apparatus of claim 1, further comprising a reinforcing element affixed about the sleeve proximate the upper end of the flexible pole for reinforcing the sleeve against friction.

4. The apparatus of claim 1, wherein the sleeve is pendulous beyond the upper end of the flexible pole.

5. The apparatus of claim 4, wherein a proximal end of the sleeve opposite the distal end is secured below the bottom end of the flexible pole.

6. The apparatus of claim 1, further comprising a base for receiving a bottom end of the flexible pole, such that the flexible pole is freely rotatable within the base.

7. The apparatus of claim 1, wherein when the apparatus is in an as-used configuration, the flexible pole is substantially vertical in orientation.

8. An apparatus for providing multidirectional exercise to animals, comprising:
a flexible pole having an exterior surface, an upper end, and a bottom end;
a sleeve coupled about the exterior surface of the flexible pole and having a distal end, wherein the sleeve surrounds a length of the flexible pole between the upper end and the bottom end and extends beyond the upper end of the flexible pole and extends beyond the bottom end of the flexible pole,
an attachment member adjacent to the distal end of the sleeve; and
a base having a generally tubular structure for receiving the bottom end of the flexible pole, such that the flexible pole is freely rotatable within the base when placed therein.

9. The apparatus of claim 8, further comprising a reinforcing element about a bottom portion of the sleeve, the bottom portion of the sleeve corresponding to a portion of the sleeve mated with the base.

10. The apparatus of claim 8, further comprising a plate permanently affixed to the base.

11. The apparatus of claim 10, wherein the plate is a stabilizing plate.

12. The apparatus of claim 10, wherein the base is oriented to be attached to a vertical surface.

13. The apparatus of claim 8, wherein the base has an opening for receiving a keeper at a bottom end of the flexible pole and a cover for covering the opening.

14. The apparatus of claim 8, wherein the attachment member is a loop at the distal end of the sleeve.

15. The apparatus of claim 14, wherein the loop is continuous with the sleeve, the loop being formed by folding the sleeve onto itself and securing the loop with fasteners.

* * * * *